(12) United States Patent
Molin et al.

(10) Patent No.: US 8,867,880 B2
(45) Date of Patent: Oct. 21, 2014

(54) LARGE BANDWIDTH MULTIMODE OPTICAL FIBER HAVING A REDUCED CLADDING EFFECT

(75) Inventors: Denis Molin, Draveil (FR); Koen de Jongh, Son en Breugel (NL); Pierre Sillard, Le Chesnay (FR); Yves Lumineau, Herblay (FR)

(73) Assignee: Draka Comteq, B.V., Amsterdam (NL)

( * ) Notice: Subject to any disclaimer, the term of this patent is extended or adjusted under 35 U.S.C. 154(b) by 404 days.

(21) Appl. No.: 12/794,229

(22) Filed: Jun. 4, 2010

(65) Prior Publication Data
US 2010/0310218 A1 Dec. 9, 2010

Related U.S. Application Data

(60) Provisional application No. 61/185,462, filed on Jun. 9, 2009.

(30) Foreign Application Priority Data

Jun. 5, 2009 (FR) ...................................... 09 02724

(51) Int. Cl.
- *G02B 6/028* (2006.01)
- *G02B 6/02* (2006.01)
- *G02B 6/036* (2006.01)

(52) U.S. Cl.
CPC .......... *G02B 6/0288* (2013.01); *G02B 6/03627* (2013.01)
USPC .......................................... 385/124; 385/126

(58) Field of Classification Search
USPC .................. 385/123, 124, 126, 127
See application file for complete search history.

(56) References Cited

U.S. PATENT DOCUMENTS

| | | | |
|---|---|---|---|
| 4,111,525 A | 9/1978 | Kaminow et al. |
| 4,184,744 A | 1/1980 | Onoda et al. |
| 4,185,890 A | 1/1980 | Onoda et al. |
| 4,222,631 A | 9/1980 | Olshansky |
| 4,229,070 A | 10/1980 | Olshansky et al. |

(Continued)

FOREIGN PATENT DOCUMENTS

| | | |
|---|---|---|
| EP | 1921478 A1 | 5/2008 |
| EP | 2259105 A1 | 12/2010 |

(Continued)

OTHER PUBLICATIONS

Sasaki, P.L. Francois, D.N. Payne, "Accuracy and resolution of preform index-profiling by the spatial-filtering method," ECOC'81, 6.4-1, Copenhagen, Denmark.

(Continued)

*Primary Examiner* — Charlie Peng
*Assistant Examiner* — Robert Tavlykaev
(74) *Attorney, Agent, or Firm* — Additon, Higgins & Pendleton, P.A.

(57) ABSTRACT

A multimode optical fiber includes a central core having a radius ($r_1$) and an alpha-index profile. The multimode optical fiber further includes a depressed trench, which surrounds the central core, that has a width ($w_t$) and a refractive index difference ($\Delta n_t$) with an outer optical cladding. Typically, the central core's diameter is between about 47 and 53 microns, and the depressed trench's width ($w_t$) is between 0.5 micron and 2 microns. The depressed trench's refractive index difference ($\Delta n_t$) with the outer optical cladding is typically between $-4\times10^{-3}$ and $-1\times10^{-3}$.

21 Claims, 6 Drawing Sheets

2nd embodiment

(56) References Cited

U.S. PATENT DOCUMENTS

| | | | |
|---|---|---|---|
| 4,230,396 A | 10/1980 | Olshansky et al. | |
| 4,339,174 A | 7/1982 | Levin | |
| 4,406,517 A | 9/1983 | Olshansky | |
| 4,465,335 A | 8/1984 | Eppes | |
| 4,636,235 A | 1/1987 | Glessner et al. | |
| 4,636,236 A | 1/1987 | Glessner et al. | |
| 4,653,042 A | 3/1987 | d'Auria et al. | |
| 4,715,695 A | 12/1987 | Nishimura et al. | |
| 4,723,828 A | 2/1988 | Garel-Jones et al. | |
| 4,838,643 A | 6/1989 | Hodges et al. | |
| 5,115,486 A * | 5/1992 | Bader et al. | 385/124 |
| 5,142,603 A | 8/1992 | Forrester | |
| 5,194,714 A | 3/1993 | Le Sergent | |
| 5,278,687 A | 1/1994 | Jannson et al. | |
| 5,381,503 A | 1/1995 | Kanamori et al. | |
| 5,522,007 A | 5/1996 | Drouart et al. | |
| 5,574,816 A | 11/1996 | Yang et al. | |
| 5,702,497 A | 12/1997 | Oh et al. | |
| 5,717,805 A | 2/1998 | Stulpin | |
| 5,761,362 A | 6/1998 | Yang et al. | |
| 5,841,933 A | 11/1998 | Hoaglin et al. | |
| 5,911,023 A | 6/1999 | Risch et al. | |
| 5,982,968 A | 11/1999 | Stulpin | |
| 6,002,818 A | 12/1999 | Fatehi et al. | |
| 6,035,087 A | 3/2000 | Bonicel et al. | |
| 6,066,397 A | 5/2000 | Risch et al. | |
| 6,085,009 A | 7/2000 | Risch et al. | |
| 6,134,363 A | 10/2000 | Hinson et al. | |
| 6,175,677 B1 | 1/2001 | Yang et al. | |
| 6,181,857 B1 | 1/2001 | Emeterio et al. | |
| 6,185,346 B1 | 2/2001 | Asawa et al. | |
| 6,202,447 B1 | 3/2001 | Drouart et al. | |
| 6,210,802 B1 | 4/2001 | Risch et al. | |
| 6,215,931 B1 | 4/2001 | Risch et al. | |
| 6,269,663 B1 | 8/2001 | Drouart et al. | |
| 6,292,603 B1 | 9/2001 | Mizuochi et al. | |
| 6,292,612 B1 | 9/2001 | Golowich et al. | |
| 6,314,224 B1 | 11/2001 | Stevens et al. | |
| 6,321,012 B1 | 11/2001 | Shen | |
| 6,321,014 B1 | 11/2001 | Overton et al. | |
| 6,330,382 B1 | 12/2001 | Harshbarger et al. | |
| 6,334,016 B1 | 12/2001 | Greer, IV | |
| 6,363,195 B1 | 3/2002 | Abbott, III et al. | |
| 6,381,390 B1 | 4/2002 | Hutton et al. | |
| 6,434,309 B1 | 8/2002 | Abbott, III et al. | |
| 6,438,303 B1 | 8/2002 | Abbott, III et al. | |
| 6,470,126 B1 | 10/2002 | Mukasa | |
| 6,490,398 B2 | 12/2002 | Gruner-Nielsen et al. | |
| 6,493,491 B1 | 12/2002 | Shen et al. | |
| 6,580,543 B1 | 6/2003 | Fan et al. | |
| 6,580,863 B2 | 6/2003 | Yegnanarayanan et al. | |
| 6,603,908 B2 | 8/2003 | Dallas et al. | |
| 6,606,437 B1 | 8/2003 | Mukasa et al. | |
| 6,618,534 B2 | 9/2003 | Abbott, III et al. | |
| 6,618,538 B2 | 9/2003 | Nechitailo et al. | |
| 6,618,543 B1 | 9/2003 | Fujita et al. | |
| 6,658,184 B2 | 12/2003 | Bourget et al. | |
| 6,724,965 B2 | 4/2004 | Abbott et al. | |
| 6,724,966 B2 | 4/2004 | Mukasa | |
| 6,735,985 B2 | 5/2004 | DiGiovanni et al. | |
| 6,749,446 B2 | 6/2004 | Nechitailo | |
| 6,750,294 B2 | 6/2004 | Sugiyama et al. | |
| 6,771,865 B2 | 8/2004 | Blaszyk et al. | |
| 6,904,218 B2 | 6/2005 | Sun et al. | |
| 6,912,347 B2 | 6/2005 | Rossi et al. | |
| 6,922,515 B2 | 7/2005 | Nechitailo et al. | |
| 6,941,049 B2 | 9/2005 | Risch et al. | |
| 7,006,751 B2 | 2/2006 | Provost et al. | |
| 7,043,126 B2 | 5/2006 | Guan et al. | |
| 7,043,128 B2 | 5/2006 | DiGiovanni et al. | |
| 7,045,010 B2 | 5/2006 | Sturman, Jr. | |
| 7,089,765 B2 | 8/2006 | Schaper et al. | |
| 7,162,128 B2 | 1/2007 | Lovie et al. | |
| 7,228,032 B2 | 6/2007 | Blauvelt et al. | |
| 7,315,677 B1 | 1/2008 | Li et al. | |
| 7,322,122 B2 | 1/2008 | Overton et al. | |
| 7,336,877 B2 | 2/2008 | Bickham | |
| 7,346,244 B2 | 3/2008 | Gowan et al. | |
| 7,356,234 B2 | 4/2008 | de Montmorillon et al. | |
| 7,400,835 B2 | 7/2008 | Sardesai et al. | |
| 7,406,235 B2 | 7/2008 | Guan et al. | |
| 7,421,172 B2 | 9/2008 | Matthijse et al. | |
| 7,421,174 B2 | 9/2008 | Fleming, Jr. et al. | |
| 7,483,612 B2 | 1/2009 | Digiovanni et al. | |
| 7,483,613 B2 | 1/2009 | Bigot-Astruc et al. | |
| 7,515,795 B2 | 4/2009 | Overton et al. | |
| 7,526,177 B2 | 4/2009 | Matthijsse et al. | |
| 7,539,381 B2 | 5/2009 | Chen et al. | |
| 7,555,186 B2 | 6/2009 | Flammer et al. | |
| 7,567,739 B2 | 7/2009 | Overton et al. | |
| 7,570,852 B2 | 8/2009 | Nothofer et al. | |
| 7,587,111 B2 | 9/2009 | de Montmorillon et al. | |
| 7,599,589 B2 | 10/2009 | Overton et al. | |
| 7,623,747 B2 | 11/2009 | de Montmorillon et al. | |
| 7,639,915 B2 | 12/2009 | Parris et al. | |
| 7,646,952 B2 | 1/2010 | Parris | |
| 7,646,954 B2 | 1/2010 | Tatat | |
| 7,646,955 B2 | 1/2010 | Donlagic | |
| 7,702,204 B2 | 4/2010 | Gonnet et al. | |
| 7,783,149 B2 | 8/2010 | Fini | |
| 7,787,731 B2 | 8/2010 | Bookbinder et al. | |
| 7,817,257 B2 | 10/2010 | Takenaga et al. | |
| 7,826,691 B2 | 11/2010 | Matthijsse et al. | |
| 7,865,050 B1 | 1/2011 | Sun et al. | |
| 7,878,712 B2 | 2/2011 | Shimotakahara et al. | |
| 7,903,917 B2 | 3/2011 | Bickham et al. | |
| 7,903,918 B1 | 3/2011 | Bickham et al. | |
| 8,009,950 B2 | 8/2011 | Molin et al. | |
| 8,145,027 B2 | 3/2012 | Overton et al. | |
| 8,184,936 B2 | 5/2012 | Zhang et al. | |
| 8,428,411 B2 | 4/2013 | De Montmorillon et al. | |
| 2002/0102082 A1 | 8/2002 | Sarchi et al. | |
| 2002/0176678 A1 | 11/2002 | Mukasa | |
| 2002/0197038 A1 | 12/2002 | Abbott et al. | |
| 2003/0024276 A1 | 2/2003 | Anderson et al. | |
| 2004/0146260 A1 | 7/2004 | Kalish et al. | |
| 2004/0247269 A1 | 12/2004 | Hirano et al. | |
| 2005/0008312 A1 | 1/2005 | Jang et al. | |
| 2006/0039665 A1 * | 2/2006 | Matsuo et al. | 385/127 |
| 2007/0172182 A1 | 7/2007 | Lee et al. | |
| 2008/0166094 A1 | 7/2008 | Bookbinder et al. | |
| 2008/0292262 A1 | 11/2008 | Overton et al. | |
| 2008/0317410 A1 | 12/2008 | Griffioen et al. | |
| 2009/0003785 A1 | 1/2009 | Parris et al. | |
| 2009/0041414 A1 | 2/2009 | Lavenne et al. | |
| 2009/0052851 A1 | 2/2009 | Donlagic | |
| 2009/0059353 A1 | 3/2009 | Fini | |
| 2009/0060437 A1 | 3/2009 | Fini et al. | |
| 2009/0092365 A1 | 4/2009 | Donlagic | |
| 2009/0154888 A1 | 6/2009 | Abbott, III et al. | |
| 2009/0169163 A1 | 7/2009 | Abbott, III et al. | |
| 2009/0175583 A1 | 7/2009 | Overton | |
| 2009/0214167 A1 | 8/2009 | Lookadoo et al. | |
| 2009/0252469 A1 | 10/2009 | Sillard et al. | |
| 2009/0279833 A1 | 11/2009 | Overton et al. | |
| 2009/0279835 A1 | 11/2009 | de Montmorillon et al. | |
| 2009/0279836 A1 | 11/2009 | de Montmorillon et al. | |
| 2009/0297107 A1 | 12/2009 | Tatat | |
| 2010/0021170 A1 | 1/2010 | Lumineau et al. | |
| 2010/0028020 A1 | 2/2010 | Gholami et al. | |
| 2010/0040336 A1 | 2/2010 | Chen et al. | |
| 2010/0067855 A1 | 3/2010 | Barker | |
| 2010/0067857 A1 | 3/2010 | Lovie et al. | |
| 2010/0067858 A1 | 3/2010 | Kim et al. | |
| 2010/0092135 A1 | 4/2010 | Barker et al. | |
| 2010/0092138 A1 | 4/2010 | Overton | |
| 2010/0092139 A1 | 4/2010 | Overton | |
| 2010/0092140 A1 | 4/2010 | Overton | |
| 2010/0098431 A1 | 4/2010 | Donlagic | |
| 2010/0118388 A1 | 5/2010 | Pastouret et al. | |
| 2010/0119202 A1 | 5/2010 | Overton | |
| 2010/0135623 A1 | 6/2010 | Overton | |
| 2010/0135624 A1 | 6/2010 | Overton et al. | |
| 2010/0135625 A1 | 6/2010 | Overton | |

(56) References Cited

U.S. PATENT DOCUMENTS

| | | | |
|---|---|---|---|
| 2010/0135627 A1 | 6/2010 | Pastouret et al. | |
| 2010/0142033 A1 | 6/2010 | Regnier et al. | |
| 2010/0142969 A1 | 6/2010 | Gholami et al. | |
| 2010/0150505 A1 | 6/2010 | Testu et al. | |
| 2010/0154479 A1 | 6/2010 | Milicevic et al. | |
| 2010/0166375 A1 | 7/2010 | Parris | |
| 2010/0171945 A1 | 7/2010 | Gholami et al. | |
| 2010/0220966 A1* | 9/2010 | Bennett | 385/124 |
| 2010/0254653 A1 | 10/2010 | Molin et al. | |
| 2010/0310218 A1 | 12/2010 | Molin et al. | |
| 2011/0002590 A1 | 1/2011 | Ooizumi et al. | |
| 2011/0037183 A1 | 2/2011 | Tudury et al. | |
| 2011/0044594 A1 | 2/2011 | Tudury et al. | |
| 2011/0044596 A1 | 2/2011 | Zhang et al. | |
| 2011/0054861 A1 | 3/2011 | Lane | |
| 2011/0054862 A1 | 3/2011 | Pimpinella et al. | |
| 2011/0058781 A1 | 3/2011 | Molin et al. | |
| 2011/0064367 A1 | 3/2011 | Molin et al. | |
| 2011/0085770 A1 | 4/2011 | Bigot-Astruc et al. | |
| 2011/0123161 A1 | 5/2011 | Molin et al. | |
| 2011/0123162 A1 | 5/2011 | Molin et al. | |
| 2011/0135262 A1 | 6/2011 | Molin et al. | |
| 2011/0135263 A1 | 6/2011 | Molin et al. | |
| 2011/0194827 A1 | 8/2011 | Jiang et al. | |
| 2011/0217012 A1 | 9/2011 | Bigot-Astruc et al. | |
| 2011/0305423 A1 | 12/2011 | Molin et al. | |
| 2012/0092651 A1 | 4/2012 | Molin et al. | |
| 2012/0195549 A1 | 8/2012 | Molin et al. | |
| 2012/0195561 A1 | 8/2012 | Molin et al. | |
| 2012/0243843 A1 | 9/2012 | Molin et al. | |
| 2012/0251062 A1 | 10/2012 | Molin et al. | |
| 2013/0028564 A1 | 1/2013 | Molin et al. | |
| 2013/0071114 A1 | 3/2013 | Bickham et al. | |

FOREIGN PATENT DOCUMENTS

| | | |
|---|---|---|
| GB | 2027224 A | 2/1980 |
| JP | 52-050246 | 4/1977 |
| JP | 52-058547 | 5/1977 |
| JP | 06-216440 A | 8/1994 |
| JP | 08-304636 A | 11/1996 |
| JP | 09-048629 | 2/1997 |
| JP | 11-064665 A | 3/1999 |
| JP | 2000-347057 A2 | 12/2000 |
| JP | 2001-235648 | 8/2001 |
| JP | 2002-318315 A | 10/2002 |
| JP | 2006-047719 A | 2/2006 |
| JP | 2006-078543 A | 3/2006 |
| JP | 2006-227173 A | 8/2006 |
| JP | 2007-272239 | 10/2007 |
| WO | 00/50941 A1 | 8/2000 |
| WO | 03/081301 A1 | 10/2003 |
| WO | 2005/106544 A1 | 11/2005 |
| WO | 2006/010798 A1 | 2/2006 |
| WO | 2009/054715 A1 | 4/2009 |
| WO | 2009/062131 A1 | 5/2009 |
| WO | 2009/078962 A1 | 6/2009 |
| WO | 2010/036684 A2 | 4/2010 |
| WO | 2011/040830 A1 | 4/2011 |

OTHER PUBLICATIONS

Kashima et al., "Transmission characteristics of graded-index optical fibers with a lossy outer layer," Applied Optics USA, vol. 17, No. 8, Apr. 15, 1978.

Jacomme, "Modal dispersion in multimode graded-index fibers," Applied Optics USA, vol. 14, No. 11, Nov. 1, 1975, pp. 2578-2584.

Okamoto et al., "Computer-Aided Synthesis of the Optimum Refractive-Index Profile for a Multimode Fiber," IEEE Transaction on Microwave Theory and Techniques, USA, vol. MTT-25, No. 3, Mar. 1977, pp. 1-10.

Donalagic, "Opportunities to Enhance Multimode Fiber Links by Application of Overfilled Launch," Journal of Lightwave Technology, vol. 23, No. 11, (Nov. 2005) pp. 3526-3540.

Morikuni et al., "Simulation-Based Prediction of Multimode Fiber Bandwidth for 10 Gb/s Systems," LEOS 2002, 15th Annual Meeting of IEEE Lasers & Electro-Optics Society, Glascow, Scotland, pp. 1-2.

European Search Report and Written Opinion in counterpart European Application No. 10164095 dated Oct. 27, 2010, pp. 1-6.

U.S. Appl. No. 12/683,775, filed Jan. 7, 2010.
U.S. Appl. No. 12/692,161, filed Jan. 22, 2010.
U.S. Appl. No. 12/694,533, filed Jan. 27, 2010.
U.S. Appl. No. 12/694,559, filed Jan. 27, 2010.
U.S. Appl. No. 12/708,810, filed Feb. 19, 2010.
U.S. Appl. No. 12/765,182, filed Apr. 22, 2010.
U.S. Appl. No. 12/649,758, filed Dec. 30, 2009.
U.S. Appl. No. 12/700,293, filed Feb. 4, 2010.
U.S. Appl. No. 12/710,584, filed Feb. 23, 2010.

Kolesar et al., "Understanding multimode bandwidth and differential mode delay measurements and their applications," Proceedings of the 51st International Wire and Cable Symposium, pp. 453-460.

Coleman et al., "Calculated EMB enhances 10GbE performance reliability for laser-optimized 50/125 µm multimode fiber," Corning Cable Systems Whitepaper.

Gloge et al., "Multimode theory of graded-core fibers", Bell system Technical Journal 1973, pp. 1563-1578.

Yabre, "Comprehensive theory of dispersion in graded-index optical fibers", Journal of Lightwave Technology, Feb. 2000, vol. 18, No. 2, pp. 166-177.

French Search Report in Counterpart French Application No. 09/02724 dated Jan. 25, 2010.

European Office Action in counterpart European Application No. 10164095.1 dated Feb. 8, 2013, pp. 1-5.

Guan et al., "Multimode Fibers for Compensating Intermodal Dispersion of Graded-Index Multimode Fibers", Jul. 2004, Journal of Lightwave Technology, vol. 22, No. 7, pp. 1714-1719.

Kaminow et al. "Profile synthesis in multicomponent glass optical fibers", Applied Optics, vol. 16, No. 1, Jan. 1, 1977, pp. 108-112.

Molin et al., "Low Bending Sensitivity of Regular OM3/OM4 Fibers in 10GbE Applications", Optical Fiber Communication (OFC) Collocated National Fiber Optic Engineers Conference, 2010 Conference on (OFC/NFOEC), IEEE, Piscataway, NJ, Mar. 21, 2010, pp. 1-3.

Pepeljugoski et al., "15.6-Gb/s Transmission Over 1 km of Next Generation Multimode Fiber", IEEE Photonics Technology Letters, vol. 14, No. 5, May 2002, pp. 1-3.

Freund, et al., "High-Speed Transmission in Multimode Fibers", Journal of Lightwave Technology, vol. 28, No. 4, Feb. 15, 2010, pp. 1-18.

Notice of Reasons for Rejection in counterpart Japanese Application No. 2010-128358 dated Sep. 24, 2013, pp. 1-2 [Document D3 (WO 2006/010798) previously cited].

English translation of Notice of Reasons for Rejection in counterpart Japanese Application No. 2010-128358 dated Sep. 24, 2013, pp. 1-2.

Okamoto et al., "Computer-Aided Synthesis of the Optimum Refractive-Index Profile for a Mutlimode Fiber," IEEE, vol. MTT-25, No. 3, Mar. 1977, pp. 213-221.

Okamoto et al., "Analysis of Wave Propagation in Optical Fibers Having Core with a-Power Refractive-Index Distribution and Uniform Cladding," IEEE, vol. MTT-24, No. 7, Jul. 1976, pp. 416-421.

* cited by examiner

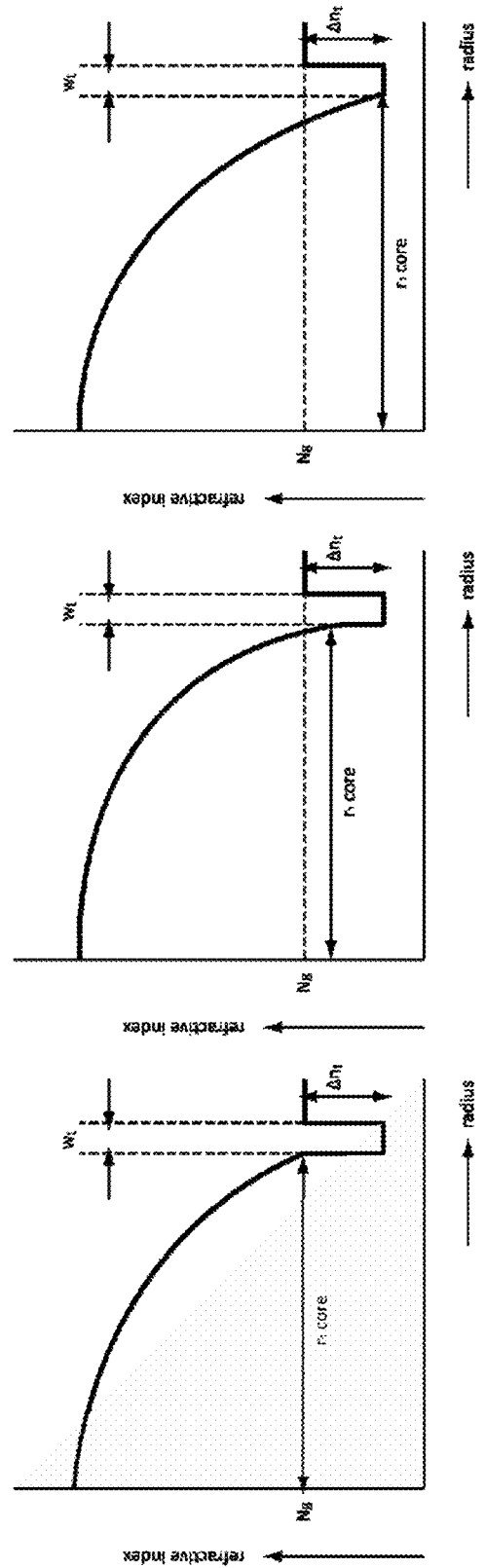

LARGE BANDWIDTH MULTIMODE OPTICAL FIBER HAVING A REDUCED CLADDING EFFECT

CROSS-REFERENCE TO PRIORITY APPLICATIONS

This application claims the benefit of commonly assigned pending French application Ser. No. 09/02724 for a "Fiber Optique Multimode A Tres Large Bande Passante Avec Une Interface Coeur-Gaine Optimisee" (filed Jun. 5, 2009, at the National Institute of Industrial Property (France)), which is hereby incorporated by reference in its entirety.

This application further claims the benefit of commonly assigned U.S. patent application No. 61/185,462 for a "Fiber Optique Multimode A Tres Large Bande Passante Avec Une Interface Coeur-Gaine Optimisee" (filed Jun. 9, 2009), which is hereby incorporated by reference in its entirety.

FIELD OF THE INVENTION

The present invention relates to the field of optical fiber transmission and, more specifically, to multimode optical fibers used in high-bandwidth applications.

BACKGROUND

An optical fiber conventionally includes an optical fiber core, which transmits and/or amplifies an optical signal, and an optical cladding, which confines the optical signal within the core. Accordingly, the refractive index of the core $n_c$ is typically greater than the refractive index of the cladding $n_g$ (i.e., $n_c > n_g$).

For optical fibers, the refractive index profile is generally classified according to the graphical appearance of the function that associates the refractive index with the radius of the optical fiber. Conventionally, the distance r to the center of the optical fiber is shown on the x-axis, and the difference between the refractive index (at radius r) and the refractive index of the optical fiber's cladding is shown on the y-axis. The refractive index profile is referred to as a "step" profile, "trapezoidal" profile, "alpha" profile, or "triangular" profile for graphs having the respective shapes of a step, a trapezoid, an alpha, or a triangle. These curves are generally representative of the optical fiber's theoretical or set profile. Constraints in the manufacture of the optical fiber, however, may result in a slightly different actual profile.

Generally speaking, two main categories of optical fibers exist: multimode fibers and single mode fibers. In a multimode fiber, for a given wavelength, several optical modes are propagated simultaneously along the optical fiber, whereas in a single mode fiber, the higher order modes are strongly attenuated. The typical diameter of a single mode or multimode optical fiber is 125 microns. The core of a multimode fiber typically has a diameter of between about 50 microns and 62.5 microns, whereas the core of a single-mode fiber typically has a diameter of between about 6 microns and 9 microns. Multimode systems are generally less expensive than single mode systems because multimode light sources, connectors, and maintenance can be obtained at a lower cost.

Multimode fibers are commonly used for short-distance applications requiring a broad bandwidth, such as local networks or LAN (local area network). Multimode fibers have been the subject of international standardization under the ITU-T G.651.1 standard, which, in particular, defines criteria (e.g., bandwidth, numerical aperture, and core diameter) that relate to the requirements for optical fiber compatibility. The ITU-T G.651.1 standard is hereby incorporated by reference in its entirety.

In addition, the OM3 standard has been adopted to meet the demands of high-bandwidth applications (i.e., a data rate higher than 1 GbE) over long distances (i.e., distances greater than 300 m). The OM3 standard is hereby incorporated by reference in its entirety. With the development of high-bandwidth applications, the average core diameter for multimode fibers has been reduced from 62.5 microns to 50 microns.

Typically, an optical fiber must have the broadest possible bandwidth for it to be usable in a high-bandwidth application. For a given wavelength, the bandwidth of an optical fiber may be characterized in several different ways. Typically, a distinction is made between the so-called "overfilled launch" condition (OFL) bandwidth and the so-called "Effective Modal Bandwidth" condition (EMB). The acquisition of the OFL bandwidth assumes the use of a light source exhibiting uniform excitation over the entire radial surface of the optical fiber (e.g., using a laser diode or light emitting diode (LED)).

Recently developed light sources used in high-bandwidth applications, such as VCSELs (Vertical Cavity Surface Emitting Lasers), exhibit an inhomogeneous excitation over the radial surface of the optical fiber. For this kind of light source, the OFL bandwidth is a less suitable measurement, and so it is preferable to use the effective modal bandwidth (EMB). The calculated effective bandwidth (EMBc) estimates the minimum EMB of a multimode fiber independent of the kind of VCSEL used. The EMBc is obtained from a dispersion-mode-delay (DMD) measurement.

FIG. 1 shows a schematic diagram of a DMD measurement according to the criteria of the FOTP-220 standard as published in its TIA SCFO-6.6 version of Nov. 22, 2002. The FOTP-220 standard is hereby incorporated by reference in its entirety. FIG. 1 shows a schematic representation of a part of an optical fiber (i.e., an optical core surrounded by an optical cladding). A DMD graph is obtained by successively injecting into the multimode fiber a light pulse having a given wavelength $\lambda_0$ with a radial offset between each successive pulse. The delay of each pulse is then measured after a given length of fiber L. Multiple identical light pulses (i.e., light pulses having the same amplitude, wavelength, and frequency) are injected with different radial offsets with respect to the center of the multimode optical fiber's core. The injected light pulse is depicted in FIG. 1 as a black dot on the optical core of the optical fiber. In order to characterize an optical fiber with a 50-micron diameter, the FOTP-220 standard requires 24 individual measurements to be carried out (i.e., at 24 different radial offset values). From these measurements, it is possible to determine the modal dispersion and the calculated effective modal bandwidth (EMBc).

The TIA-492AAAC-A standard, which is hereby incorporated by reference in its entirety, specifies the performance requirements for 50-micron-diameter multimode optical fibers used over long distances in Ethernet high-bandwidth transmission network applications. The OM3 standard requires, at a wavelength of 850 nanometers, an EMB of at least 2000 MHz·km. The OM3 standard assures error-free transmissions for a data rate of 10 Gb/s (10 GbE) up to a distance of 300 meters. The OM4 standard requires, at a wavelength of 850 nanometers, an EMB of at least 4700 MHz·km to obtain error-free transmissions for a data rate of 10 Gb/s (10 GbE) up to a distance of 550 meters. The OM4 standard is hereby incorporated by reference in its entirety.

In a multimode fiber, the difference between the propagation times, or group delay times, of the several modes along the optical fiber determine the bandwidth of the optical fiber.

In particular, for the same propagation medium (i.e., in a step-index-type multimode fiber), the different modes have different group delay times. This difference in group delay times results in a time lag between the pulses propagating along different radial offsets of the optical fiber.

For example, as shown in the graph on the right side of FIG. 1, a time lag is observed between the individual pulses. The graph in FIG. 1 depicts each individual pulse in accordance with its radial offset in microns (y-axis) and the time in nanoseconds (x-axis) the pulse took to pass along a given length of the optical fiber.

As depicted in FIG. 1, the location of the peaks along the x-axis varies, which indicates a time lag (i.e., a delay) between the individual pulses. This delay causes a broadening of the resulting light pulse. Broadening of the light pulse (i) increases the risk of the pulse being superimposed onto a following pulse and (ii) reduces the bandwidth (i.e., data rate) supported by the optical fiber. The bandwidth, therefore, is directly linked to the group delay time of the optical modes propagating in the multimode core of the optical fiber. Thus, to guarantee a broad bandwidth, it is desirable for the group delay times of all the modes to be identical. Stated differently, the intermodal dispersion should be zero, or at least minimized, for a given wavelength.

To reduce intermodal dispersion, the multimode optical fibers used in telecommunications generally have a core with a refractive index that decreases progressively from the center of the optical fiber to its interface with a cladding (i.e., an "alpha" core profile). Such an optical fiber has been used for a number of years, and its characteristics have been described in "*Multimode theory of graded-core fibers*" by D. Gloge et al., Bell system Technical Journal 1973, pp. 1563-1578, and summarized in "*Comprehensive theory of dispersion in graded-index optical fibers*" by G. Yabre, Journal of Lightwave Technology, February 2000, Vol. 18, No. 2, pp. 166-177. Each of the above-referenced articles is hereby incorporated by reference in its entirety.

A graded-index profile (i.e., an alpha-index profile) can be described by a relationship between the refractive index value n and the distance r from the center of the optical fiber according to the following equation:

$$n = n_1 \sqrt{1 - 2\Delta\left(\frac{r}{a}\right)^\alpha}$$

wherein, $\alpha \geq 1$, and $\alpha$ is a non-dimensional parameter that is indicative of the shape of the index profile;

$n_1$ is the maximum refractive index of the optical fiber's core;

a is the radius of the optical fiber's core; and $$\Delta = \frac{(n_1^2 - n_0^2)}{2n_1^2}$$

wherein $n_0$ is the minimum index of the multimode core, which generally corresponds to the index of the cladding (most often made of silica).

A multimode fiber with a graded index (i.e., an alpha profile) therefore has a core profile with a rotational symmetry such that along any radial direction of the optical fiber the value of the refractive index decreases continuously from the center of the optical fiber to its periphery. When a multimode light signal propagates in such a graded-index core, the different optical modes experience differing propagation mediums (i.e., because of the varying refractive indices), which affects the propagation speed of each optical mode differently. Thus, by adjusting the value of the parameter $\alpha$, it is possible to obtain a group delay time that is virtually equal for all of the modes. Stated differently, the refractive index profile can be modified to reduce or even eliminate intermodal dispersion.

In practice, however, a manufactured multimode fiber has a graded-index central core surrounded by an outer cladding of constant index. Thus, the core of the multimode fiber never corresponds to a theoretically perfect alpha profile (i.e., the alpha set profile), because the interface of the core (having an alpha profile) with the outer cladding (having a constant index) interrupts the alpha profile. The outer optical cladding accelerates the higher-order modes with respect to the lower-order modes. This phenomenon, known as the "cladding effect," can be seen in the graph of the DMD measurements of a simulated fiber presented in FIG. 2.

As shown in FIG. 2, the response signals acquired for the highest radial positions (i.e., a high radial offset, such as above 20 microns) exhibit multiple pulses. These "dual-pulses" are attributable to the fact that the higher-order modes are accelerated when propagating through the cladding rather than through the core. In this regard, these accelerated higher-order modes will arrive at different times than will the lower-order modes. The presence of such multiple pulses is reflected in a temporal broadening of the resulting response signal. As a result of this cladding effect, the bandwidth is reduced. Therefore, to achieve the performance requirements of the TIA-492AAAC-A standard, the cladding effect in the optical fiber should be reduced, if not eliminated.

International Publication No. WO 2006/010798 and its counterpart U.S. Publications Nos. 2009/0052851 and 2010/0098431, each of which is hereby incorporated by reference in its entirety, describe a multimode optical fiber that includes a graded-index central core and a depressed trench located at the periphery of the central core. The graded-index profile of the central core is extended to the bottom of a depressed trench (i.e., an extended depressed gradient core), which is followed by a depression of constant refractive index. This kind of prior art profile is shown in FIG. 10C, which is further explained below. The extended depressed gradient core is considered to be part of the core and the depression of constant refractive index is considered to be a depressed trench. The extension of the alpha-index core under the outer optical cladding and to the bottom of the depressed trench (i.e., an extended depressed gradient core) can lead to an increase in the size of the core. Increasing the size of the core, however, can result in incompatibility with the aforementioned OM3 and OM4 standards. The extension of the core to negative refractive index values can also generate losses because of the propagation of leaky modes, which are intrinsic to the geometry of a depressed trench.

Commonly assigned International Publication No. WO 2009/054715, which is hereby incorporated by reference in its entirety, discloses a multimode optical fiber that includes a central core having a graded-index profile and a depressed cladding positioned at the periphery of the central core. This graded-index profile of the core is extended to the bottom of the depressed trench and is followed by a depression of constant refractive index. As previously discussed, this kind of refractive index profile is shown in FIG. 10C, which is further explained below. Furthermore, this kind of prior art profile can lead to (i) an increase in the size of the core, (ii) incompatibility with the OM3 and OM4 standards, and/or (iii) losses caused by the propagation of leaky modes.

U.S. Pat. No. 4,339,174, which is hereby incorporated by reference in its entirety, describes a multimode fiber including a core having a graded-index profile and having a reduced cladding effect. The optical fiber, however, has a diameter of 60.5 microns and is not particularly suitable for high-bandwidth applications.

U.S. Pat. No. 4,184,744, which is hereby incorporated by reference in its entirety, discloses a multimode optical fiber that includes a central core having a graded-index profile and a depressed trench (called intermediate layer) situated at the periphery of the central core. The thickness of the depressed trench is between 0.1 and 1 times the radius of the core. Thus, for a core having a radius of 50 microns, the thickness of the intermediate layer (i.e., the depressed trench) is between 5 and 50 microns. This thick intermediate layer eliminates the highest order modes (i.e., the modes that are influenced the most by the cladding effect) but undesirably reduces the bandwidth of the optical fiber.

U.S. Pat. Nos. 4,229,070 and 4,230,396, each of which is hereby incorporated by reference in its entirety, describe multimode fibers having a graded-index core surrounded by a depressed trench in order to reduce the cladding effect. The optical fibers, however, have a diameter of 62.5 microns and are not suitable for high-bandwidth applications.

Therefore, a need exists for a high-bandwidth multimode fiber (i) that has a refractive index profile including a graded-index core and a depressed trench and (ii) that reduces the cladding effect.

SUMMARY

Accordingly, in one aspect, the invention embraces a multimode optical fiber that includes an optical core having an alpha-index profile with respect to an outer optical cladding. The diameter of the central core is typically between about 47 microns and 53 microns (i.e., 50±3 microns). A depressed trench, which is positioned around the central core, typically has an index difference with the outer cladding of between about $-4\times10^{-3}$ and $-1\times10^{-3}$. The width of the depressed trench is typically between about 0.5 micron and 2 microns.

In an exemplary embodiment, the refractive index difference between the end of the alpha-index profile of the central core (i.e., the refractive index at the central core's outermost radius) and the outer optical cladding is between about $-0.5\times 10^{-3}$ and 0.

In yet another exemplary embodiment, the central core has a maximum refractive index difference with the outer optical cladding of between about $11\times10^{-3}$ and $16\times10^{-3}$.

In yet another exemplary embodiment, the alpha-index profile of the central core has an alpha parameter of between about 1.9 and 2.1.

In yet another exemplary embodiment, the refractive index difference of the depressed trench with the outer optical cladding is constant over the entire width of the depressed trench.

In yet another exemplary embodiment, the optical fiber has a numerical aperture (NA) of 0.200±0.015.

In yet another exemplary embodiment, the optical fiber has a bandwidth at a radial offset of 25 microns (i.e., Radial Offset Bandwidth-ROB25) of at least about 2000 MHz·km.

In yet another exemplary embodiment, the optical fiber has a bandwidth at a radial offset of 25 microns (i.e., Radial Offset Bandwidth-ROB25) of at least about 4000 MHz·km.

In yet another exemplary embodiment, the optical fiber has an overfilled launch (OFL) bandwidth of at least 1500 MHz·km.

In yet another exemplary embodiment, the optical fiber has an overfilled launch (OFL) bandwidth of at least 3500 MHz·km.

In yet another exemplary embodiment, the optical fiber has an effective modal bandwidth (EMB) of at least 2000 MHz·km.

In yet another exemplary embodiment, the optical fiber has an effective modal bandwidth (EMB) of at least 4000 MHz·km.

In another aspect, the invention embraces a multimode optical system that includes at least a portion of the optical fiber according to the present invention.

In an exemplary embodiment, the multimode optical system has a data rate that is at least 10 GbE (Gb/s) up to 100 meters.

In another exemplary embodiment, the multimode optical system has a data rate that is at least 10 GbE (Gb/s) up to 300 meters.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIGS. 10A-10C graphically depict the refractive index profiles of two exemplary optical fibers (10A and 10B) according to the present invention and a comparative optical fiber (10C).

DETAILED DESCRIPTION

Figure 1:
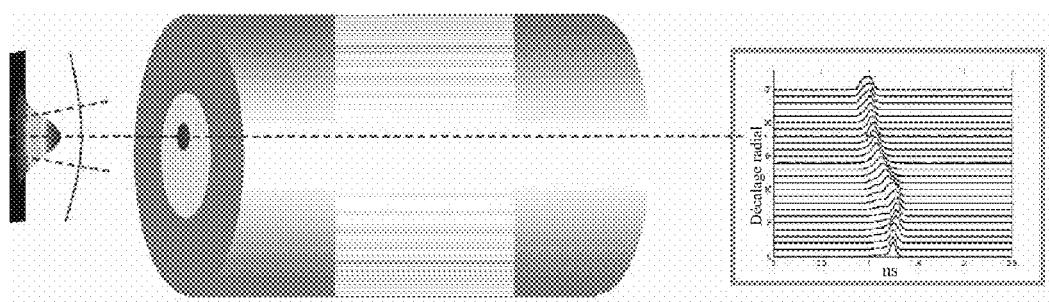
FIG. 1 schematically depicts an exemplary DMD measurement method and graph.
Figure 2:
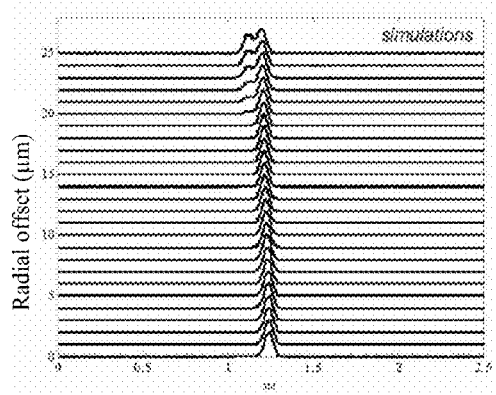
FIG. 2 schematically depicts an exemplary graph of DMD measurements.

The multimode optical fiber of the present invention includes a central core of radius $r_1$ with an alpha-index profile (i.e., with respect to an outer optical cladding). The multimode optical fiber of the present invention also includes a depressed trench situated at the periphery of the central core. The depressed trench has a width $w_t$ and an index difference $\Delta n_t$ with the outer optical cladding.

The design of the present multimode optical fiber achieves a reduced cladding effect. By way of example, the central core's radius $r_1$, the characteristics of the central core's alpha-index profile, the depressed trench's width $w_t$, and the depressed trench's index difference $\Delta n_t$ together reduce, if not minimize, the cladding effect. Exemplary embodiments of the multimode optical fiber may have an effective modal bandwidth (EMB) greater than 2000 MHz·km (e.g., greater than 4700 MHz·km).

The cladding effect of an optical fiber may be determined by establishing the optical fiber's Radial Offset Bandwidth (ROB). The ROB is typically determined using DMD measurements, which are obtained by injecting an input pulse having (i) a wavelength of 850 nanometers and (ii) a spatial width of 5 microns+/−0.5 micron. Typically, the input pulse is obtained by coupling a light source (e.g., a semiconductor or titanium-sapphire laser) to a single-mode optical fiber having its outlet face positioned 10 microns or less from the inlet face of the multimode optical fiber. The temporal profile of the output pulse (i.e., the light pulse emitted from the outlet end of the multimode fiber) can be measured for each radial offset. The ROB at a radial offset X (in microns), denoted ROBX, is calculated by utilizing the information contained in the broadening and the deformation of the temporal profile of the output pulse obtained for an injection at the radial offset X for a given wavelength $\lambda_0$ (e.g., 850 nanometers), which corresponds to a given frequency f. A transfer function $H^X(f)$ may be obtained using a Fourier transform and a pulse deconvolution corresponding to each radial offset.

In this regard, $S_e(f)$ represents the Fourier transform of the input pulse measured according to the TIA-455-220-A 5.1 standard. Similarly, $S_s(f,X)$ represents the Fourier transform of the output pulse corresponding to the X offset launch measured according to the TIA-455-220-A 5.1 standard. Those having ordinary skill in the art will recognize that the Fourier transform of the outlet pulse is a function of both frequency f and radial offset X.

For each offset launch X, a transfer function $H^X(f)$ can be defined as follows:

$$H^X(f) = \frac{S_S(f, X)}{S_e(f)}$$

ROBX is the −3 dB bandwidth of the transfer function $H^X(f)$ corresponding to the response of the optical fiber for an injection at a radial offset of X in the DMD measurements.

In practice, the bandwidth is calculated for an attenuation of −1.5 dB and then extrapolated for an attenuation of −3 dB, assuming a Gaussian response, and multiplying by a factor $\sqrt{2}$ (as is also the case for the calculation of the effective bandwidth):

$$ROBX = \sqrt{2} \cdot f_X$$

$$10 \cdot \log_{10}(H^{(X)}(f_X)) = -1.5$$

An exemplary method of measuring DMD and calculating the effective modal bandwidth can be found in the FOTP-220 standard, which, as noted, is incorporated by reference in its entirety.

For further details on this technique, reference can be made to the following publications: P. F. Kolesar and D. J. Mazzarese, "*Understanding multimode bandwidth and differential mode delay measurements and their applications*," Proceedings of the 51st International Wire and Cable Symposium, pp. 453-460, which is hereby incorporated by reference; and D. Coleman and Philip Bell "*Calculated EMB enhances 10 GbE performance reliability for laser-optimized 50/125 μm multimode fiber*," Corning Cable Systems Whitepaper, which is hereby incorporated by reference.

The FOTP-220 standard (and in particular its Annex D) provides linear combination parameters corresponding to a plurality of light sources that are notional (i.e., theoretical) but representative of sources that are genuinely available. The smallest modal bandwidth obtained from these notional sources may be taken as the calculated EMB (EMBc).

Figure 3:
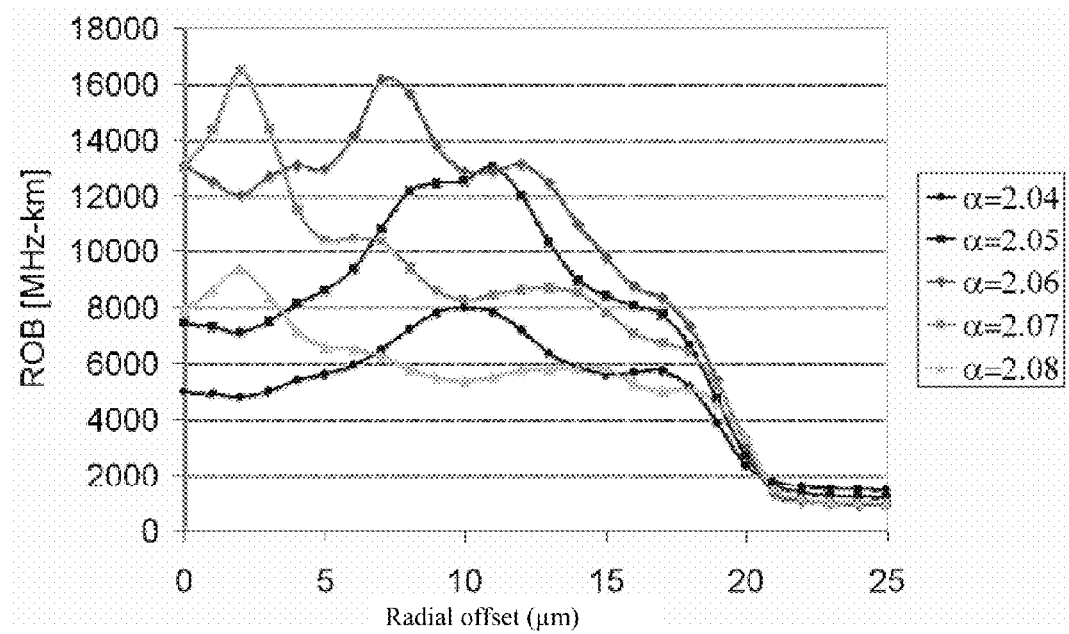
FIG. 3 graphically depicts radial offset bandwidth (ROB) as a function of radial offset (measured at 850 nanometers) for a plurality of optical fibers having alpha-type profiles.

FIG. 3 graphically depicts the ROB as a function of the radial offset measured at a wavelength of 850 nanometers. The ROB is plotted on the y-axis and the radial offset is plotted on the x-axis. The ROB in FIG. 3 is plotted for optical fibers with an alpha-index profile having various values of the alpha parameter (i.e., simulated fibers having alpha parameters between 2.04 and 2.08). As shown, ROBX depends strongly on the value of the alpha parameter for radial offsets between about 0 and 18 microns. Beyond a radial offset of 18 microns (i.e., beyond ROB18), the value of ROBX is less than 2000 MHz·km. After ROB18, the ROBX is not very sensitive to the alpha parameter (i.e., the traces for the different alpha values do not vary significantly). In this regard, beyond a radial offset of 18 microns the value of ROBX depends primarily on the core-cladding interface.

Typically, the optical fiber's central core has a radius of about 25 microns. In this regard, in the outer 7 microns of the central core (i.e., between ROB18 and ROB25), the influence of the alpha profile is strongly reduced, while the influence of the depressed trench and the cladding primarily affects the value of ROBX.

Figure 4:
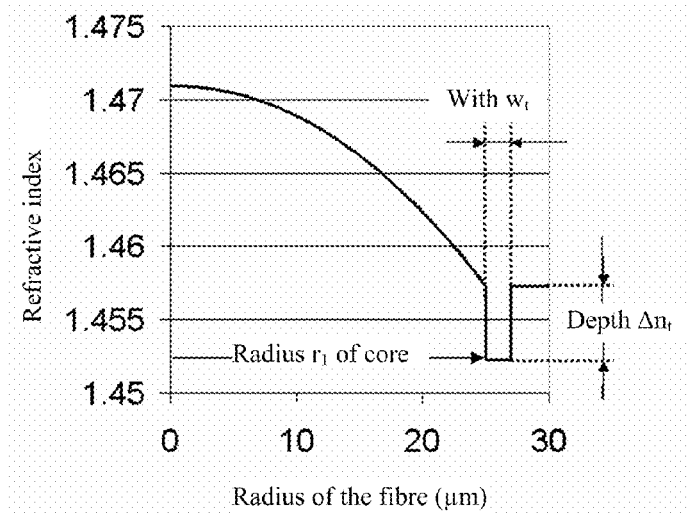
FIG. 4 graphically depicts the refractive index profile of an exemplary optical fiber according to the present invention.

In one embodiment, the multimode optical fiber of the present invention has a refractive index profile as illustrated in FIGS. 4 and 10A. The ROB25 of fiber according to this embodiment is typically greater than 2000 MHz·km (e.g., greater than 4000 MHz·km).

Typically, the multimode optical fiber of the present invention includes an optical core and an outer optical cladding. The optical core includes a central core having a graded-index profile (i.e., an alpha-index profile). The central core has a maximum refractive index at the center of the central core (i.e., at r=0), and the refractive index continuously decreases from the center of the optical fiber to the periphery of the central core. In this regard, the central core's refractive index difference with respect to the outer optical cladding is at its lowest (i.e., zero in FIGS. 4 and 10A) at the central core's outer radius. Stated differently, at the central core's outer radius, the refractive index of the central core is approximately equal to the refractive index of the outer optical cladding.

Surrounding the central core is a depressed trench. As used herein, the term "depressed trench" describes a radial portion of the optical fiber having a refractive index that is less than the refractive index of the outer optical cladding $n_g$ (i.e., a depressed trench has a negative refractive index difference with the outer optical cladding). In a refractive index profile, a depressed trench starts at a substantial vertical decrease in the refractive index.

In another embodiment, the multimode optical fiber of the present invention has a refractive index profile as illustrated in FIG. 10B. As shown, the central core's alpha-index profile has a negative refractive index value at the central core's outer radius (i.e., the graded-index central core "extends" into the depressed trench). Stated differently, at the central core's outer radius, the refractive index of the central core is less than the refractive index of the outer optical cladding. The depressed trench starts at a substantial vertical decrease in the refractive index. The portion of the graded-index profile having a negative refractive index is considered to be part of the central core and not of the depressed trench.

Typically, an outer optical cladding surrounds the depressed trench. In one exemplary embodiment, the depressed trench immediately surrounds the central core, and the outer optical cladding immediately surrounds the depressed trench.

FIG. 10C depicts the refractive index profile of a comparative optical fiber, such as the optical fiber disclosed in International Publications Nos. WO 2006/010798 and WO 2009/054715. As shown, the graded-index profile of the core is extended to the bottom of the depressed trench followed by a depression of constant index.

In some embodiments according to the present invention, the depressed trench has a constant, negative refractive index value over its entire width $w_t$. That said, it is within the scope of the present invention for the depressed trench to include two or more depressed sub-trenches, each having a constant, negative refractive index value.

Typically, the depressed trench according to the present invention has a depth $\Delta n_t$ (i.e., a negative refractive index difference with the outer optical cladding, which is depicted as a depth on the refractive index profile). The depressed trench's depth $\Delta n_t$ is typically between about $-4 \times 10^{-3}$ and $-1 \times 10^{-3}$. The significance of this range of values will be better understood by referring to FIGS. 5, 6 and 7.

Figure 5:
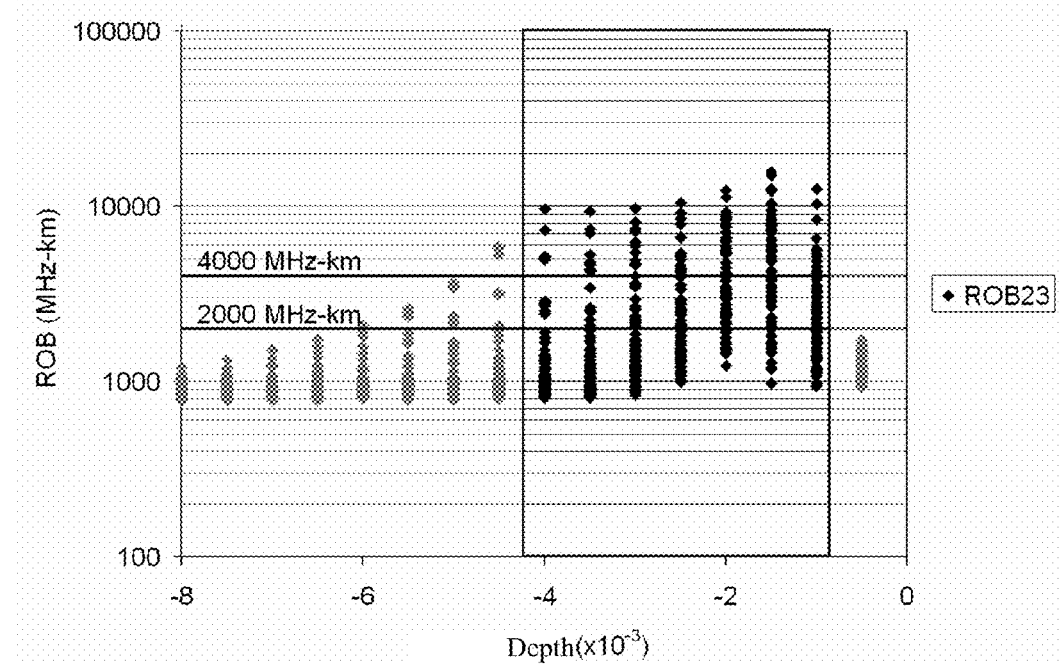
FIG. 5 graphically depicts the radial offset bandwidth at a radial offset of 23 microns (ROB23) as function of the depth of the depressed trench of an exemplary optical fiber.
Figure 6:
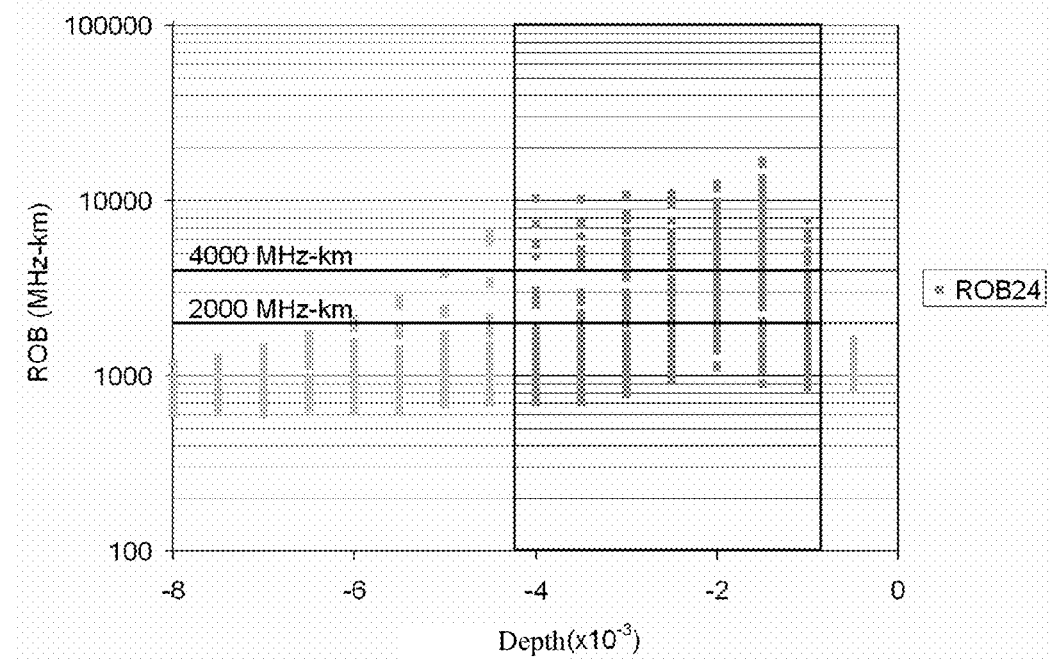
FIG. 6 graphically depicts the radial offset bandwidth at a radial offset of 24 microns (ROB24) as function of the depth of the depressed trench of an exemplary optical fiber.
Figure 7:
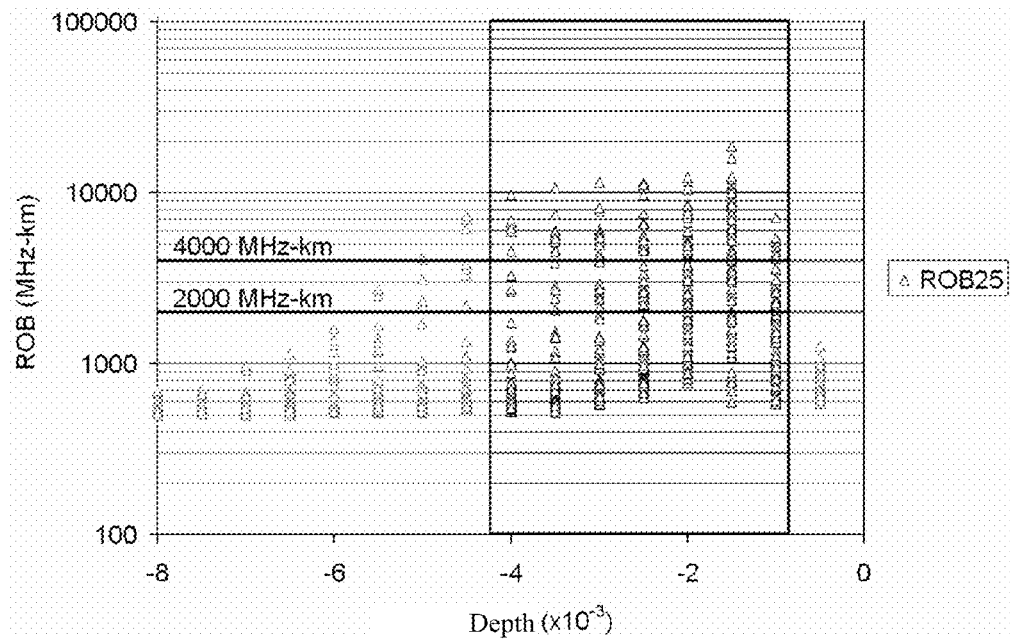
FIG. 7 graphically depicts the radial offset bandwidth at a radial offset of 25 microns (ROB25) as function of the depth of the depressed trench of an exemplary optical fiber.

FIGS. 5, 6, and 7 show radial offset bandwidth at radial offsets of 23 microns (ROB23), 24 microns (ROB24), and 25 microns (ROB25), respectively. The ROB is shown on the y-axis and the depth $\Delta n_t$ of the depressed trench is shown on the x-axis.

The ROB values of FIGS. 5-7 were generated via simulations of multiple fibers having several varied parameters. The depressed trench's width $w_t$ has been varied between 0.4 micron and 2 microns, and the depressed trench's depth $\Delta n_t$ has been varied between $-8 \times 10^{-3}$ and $-0.5 \times 10^{-3}$. Additionally, the refractive index difference between the end of the central core's alpha-index profile (i.e., the refractive index at the central core's outermost radius) and the outer optical cladding has been varied between $-0.5 \times 10^{-3}$ and 0.

As previously discussed, in the first embodiment shown in FIG. 10A, this refractive index difference is zero, and in the second embodiment shown in FIG. 10B this refractive index difference is greater than zero (in terms of absolute value). The numerical aperture has also been varied between 0.2 and 0.22.

Without being bound to any particular theory, the present inventors have found that the depth $\Delta n_t$ of the depressed trench is the main parameter that influences the ROB23, ROB24, and ROB25 values. In this regard, the depth $\Delta n_t$ can be varied to obtain ROB23, ROB24, and ROB25 values that are higher than 2000 MHz·km, while complying with the requirements of the ITU-T G.651.1 standard. Thus, the depressed trench's depth $\Delta n_t$ (e.g., a depth of between $-4 \times 10^{-3}$ and $-1 \times 10^{-3}$) ensures that the depressed trench compensates for the cladding effect of the optical fiber.

Typically, the depressed trench has a width $w_t$ that is between 0.5 micron and 2 microns. The width $w_t$ of the depressed trench is typically limited to no more than about 2 microns to ensure a numerical aperture of the optical fiber that complies with the ITU-T G.651.1 standard.

The optical fiber's central core typically has a radius $r_1$ of 25 microns (i.e., a diameter of 50 microns). The graded-index profile of the central core has a value for the alpha coefficient that is typical of a multimode fiber: $\alpha$ may be, for example, between 1.9 and 2.1. The refractive index difference of the central core with respect to the outer optical cladding has a maximum value $\Delta n_1$ (at the center of the central core) of between $11 \times 10^{-3}$ and $16 \times 10^{-3}$.

The refractive index difference between the end of the graded-index profile of the central core and the outer optical cladding is between about $-0.5 \times 10^{-3}$ and 0. Those having ordinary skill in the art will recognize that when the refractive index difference between the end of the central core's graded-index profile (i.e., at the central core's outermost radius) and the outer optical cladding is zero, the central core's graded-index profile does not extend below the index level of the outer optical cladding.

In another embodiment in which the refractive index difference between the end of the central core's graded-index profile and the outer optical cladding is positive (in terms of absolute value), the central core's graded-index profile is extended below the refractive index level of the outer optical cladding. Even so, the extension of the central core's graded-index profile does not reach the bottom of the depressed trench as disclosed in FIG. 10C for the comparative fibers. Thus, losses due to the propagation of intrinsic leaky modes are limited.

For reasons of cost, the outer optical cladding is typically made of natural silica, but it may also be made of doped silica.

The advantages of the present invention will be more evident by comparing prior art optical fibers with optical fibers according to the present invention. For purposes of comparison, a plurality of prior art fibers and a plurality of exemplary fibers according to the present invention having the same optical parameters, except for the depressed trench, were manufactured. The respective parameters of each fiber's depressed trench are shown in the Table 1 (below):

TABLE 1

|  | Depth $\Delta n_t \times 10^3$ | Width $w_t$ (microns) |
|---|---|---|
| Prior art | −0.8 | 0.8 |
| Invention | −3 | 0.8 |

Figure 8:
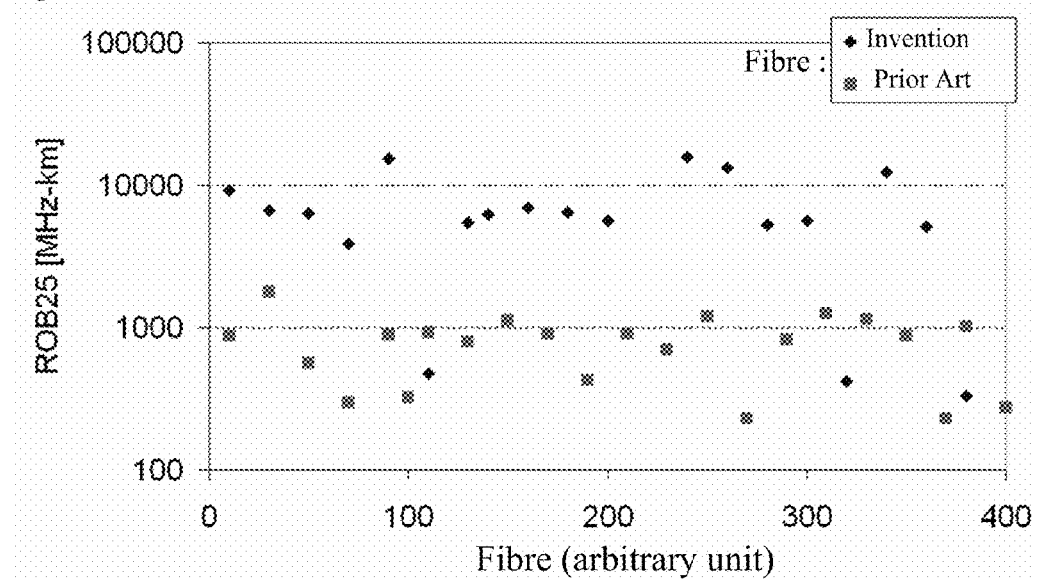
FIG. 8 graphically depicts the ROB25 values of several comparative fibers and several exemplary fibers according to the present invention.

FIG. 8 shows values for the radial offset bandwidth at a radial offset of 25 microns (ROB25) that are acquired on the comparative prior art fibers and exemplary fibers according to the present invention, as disclosed in Table 1 (above). It was observed that the majority of the inventive fibers exhibited an ROB25 value higher than 2000 MHz·km, while the comparative fibers exhibited an ROB25 value of approximately 1000 MHz·km. Indeed, some of the inventive fibers exhibited an ROB25 value higher than 10,000 MHz·km. The inventive optical fibers, therefore, typically have an ROB25 that is at least twice as high as that of the comparative optical fibers, which is desirable with respect to the reduction of the cladding effect.

Figure 9:
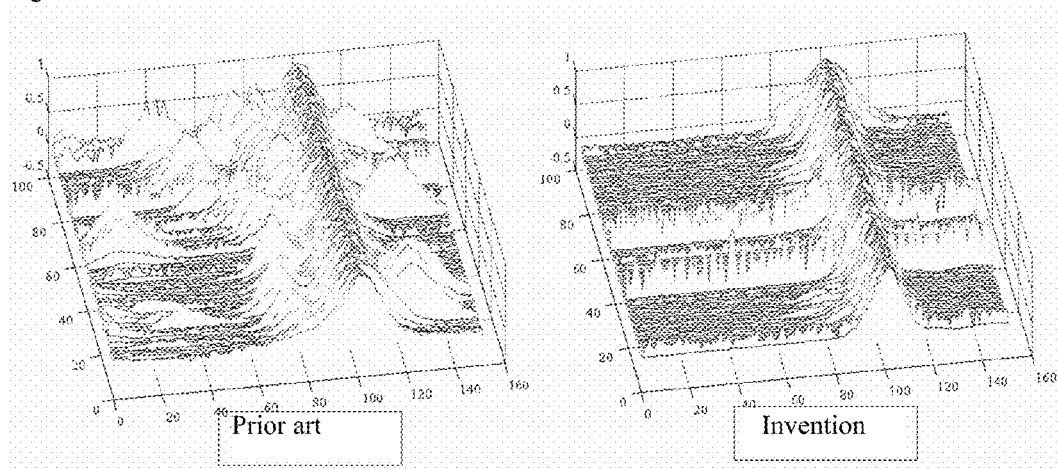
FIG. 9 depicts three dimensional (3D) graphs of responses for an injection of a light pulse with a radial offset of 25 microns (ROB25) of a comparative fiber and an exemplary fiber according to the present invention.

FIG. 9 depicts three-dimensional (3D) graphs of responses of the optical fibers from Table 1 (above) for an injection of a light pulse with a radial offset of 25 microns. Each graph shows the time scale on the x-axis, the identification numbers of each of the optical fibers on the y-axis, and the standardized amplitude of the output signal on the z-axis. The vast majority of the responses of the comparative fibers show multiple pulses, whereas the majority of the responses of the inventive fibers show a single pulse. These results indicate that the cladding effect is reduced in the optical fibers according to the present invention when compared with the optical fibers according to the prior art.

Furthermore, by comparing FIGS. 8 and 9, which were generated by the same fibers, it is evident that the inventive fibers (i) have an ROB25 value that is higher than 2000

MHz·km (e.g., higher than 4000 MHz·km) and (ii) exhibit a response for a radial offset of 25 microns in the form of a single pulse. In contrast, the comparative prior art fibers exhibit responses at a radial offset of 25 microns as multiple pulses. As a result, the inventive fibers have a smaller cladding effect. This, in turn, allows a broad bandwidth for high-bandwidth applications.

The optical fiber according to the present invention is typically compatible with the ITU-T G.651.1 standard. The optical fiber has a central core diameter of 50 microns and a numerical aperture of 0.2±0.015. It is noted that the graded-index central core does not continue in the depressed trench, which, as noted, begins at a substantial vertical decrease in the refractive index. This ensures that (i) the numerical aperture complies with the ITU-T G.651.1 standard and (ii) the cladding effect is attenuated.

According to another exemplary embodiment, the optical fiber according to the present invention complies with the OM3 standard. In particular, the optical fiber has (i) an effective modal bandwidth (EMB) greater than 2000 MHz·km, (ii) a modal dispersion less than 0.3 ps/m, and (iii) an OFL bandwidth greater than 1500 MHz·km.

According to yet another exemplary embodiment, the optical fiber according to the present invention complies with the OM4 standard. In particular, the optical fiber has (i) an effective modal bandwidth (EMB) greater than 4700 MHz·km, (ii) a modal dispersion less than 0.14 ps/m, and (iii) an OFL bandwidth greater than 3500 MHz·km.

The optical fibers according to the present invention may be manufactured by drawing from final preforms.

A final preform may be manufactured by providing a primary preform with an outer overcladding layer (i.e., an overcladding process). The outer overcladding layer consists of doped or undoped, natural or synthetic, silica glass. Several methods are available for providing the outer overcladding layer.

In a first exemplary method, the outer overcladding layer may be provided by depositing and vitrifying natural or synthetic silica particles on the outer periphery of the primary preform under the influence of heat. Such a process is known, for example, from U.S. Pat. Nos. 5,522,007, 5,194,714, 6,269,663, and 6,202,447, each of which is hereby incorporated by reference in its entirety.

In another exemplary method, a primary preform may be overcladded using a silica sleeve tube, which may or may not be doped. This sleeve tube may then be collapsed onto the primary preform.

In yet another exemplary method, an overcladding layer may be applied via an Outside Vapor Deposition (OVD) method. Here, a soot layer is first deposited on the outer periphery of a primary preform, and then the soot layer is vitrified to form glass.

The primary preforms may be manufactured via outside vapor deposition techniques, such as Outside Vapor Deposition (OVD) and Vapor Axial Deposition (VAD). Alternatively, the primary preforms may be manufactured via inside deposition techniques in which glass layers are deposited on the inner surface of a substrate tube of doped or undoped silica glass, such as Modified Chemical Vapor Deposition (MCVD), Furnace Chemical Vapor Deposition (FCVD), and Plasma Chemical Vapor Deposition (PCVD).

In an exemplary embodiment, the primary preforms are manufactured using a PCVD process, which allows the shape of the central core's gradient refractive index profile to be controlled very precisely.

The depressed trench may be deposited on the inner surface of a substrate tube as part of the chemical vapor deposition process. More typically, the depressed trench may be manufactured either (i) by using a fluorine-doped substrate tube as the starting point of the internal deposition process for deposition of the gradient refractive index central core or (ii) by sleeving a fluorine-doped silica tube over the gradient refractive index central core, which itself may be produced using an outside deposition process (e.g., OVD or VAD).

In yet another exemplary embodiment, a primary preform is manufactured via an inside deposition process using a fluorine-doped substrate tube. The resulting tube containing the deposited layers may be sleeved by one or more additional fluorine-doped silica tubes so as to increase the thickness of the depressed trench, or to create a depressed trench having a varying refractive index over its width. Although not required, one or more additional sleeve tubes (e.g., fluorine-doped substrate tubes) may be collapsed onto the primary preform before an overcladding step is carried out. The process of sleeving and collapsing is sometimes referred to as jacketing and may be repeated to build several glass layers on the outside of the primary preform.

The present invention is not limited to the exemplary embodiments described herein. The present optical fiber has good compatibility with other optical fibers and can be installed in numerous transmission systems. For example, the multimode optical fiber of the present invention can be used in an Ethernet optical system with an improved bandwidth.

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (de Montmorillon et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. patent application Ser. No. 12/098,804 for a Transmission Optical Fiber Having Large Effective Area (Sillard et al.), filed Apr. 7, 2008; International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Patent Application Publication No. US2009/0279836 A1 for a Bend-Insensitive Single-Mode Optical Fiber, filed May 6, 2009, (de Montmorillon et al.); U.S. Patent Application Publication No. US2010/0021170 A1 for a Wavelength Multiplexed Optical System with Multimode Optical Fibers, filed Jun. 23, 2009, (Lumineau et al.); U.S. Patent Application Publication No. US2010/0028020 A1 for a Multimode Optical Fibers, filed Jul. 7, 2009, (Gholami et al.); U.S. patent application Ser. No. 12/614,011 for a Reduced-Diameter Optical Fiber, filed Nov. 6, 2009, (Overton); U.S. patent application Ser. No. 12/614,172 for a Multimode Optical System, filed Nov. 6, 2009, (Gholami et al.); U.S. patent application Ser. No. 12/617,316 for an Amplifying Optical Fiber and Method of Manufacturing, filed Nov. 12, 2009, (Pastouret et al.); U.S. patent application Ser. No. 12/629,495 for an Amplifying Optical Fiber and Production Method, filed Dec. 2, 2009, (Pastouret et al.); U.S. patent application Ser.

No. 12/633,229 for an Ionizing Radiation-Resistant Optical Fiber Amplifier, filed Dec. 8, 2009, (Regnier et al.); U.S. patent application Ser. No. 12/636,277 for a Buffered Optical Fiber, filed Dec. 11, 2009, (Testu et al.); U.S. patent application Ser. No. 12/683,775 for a Method of Classifying a Graded-Index Multimode Optical Fiber, filed Jan. 7, 2010, (Gholami et al.); U.S. patent application Ser. No. 12/692,161 for a Single-Mode Optical Fiber, filed Jan. 22, 2010, (Richard et al.); U.S. patent application Ser. No. 12/694,533 for a Single-Mode Optical Fiber Having an Enlarged Effective Area, filed Jan. 27, 2010, (Sillard et al.); U.S. patent application Ser. No. 12/694,559 for a Single-Mode Optical Fiber, filed Jan. 27, 2010, (Sillard et al.); U.S. patent application Ser. No. 12/708,810 for a Optical Fiber Amplifier Having Nanostructures, filed Feb. 19, 2010, (Burow et al.); and U.S. patent application Ser. No. 12/765,182 for a Multimode Fiber, filed Apr. 22, 2010, (Molin et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,526,177 for a Fluorine-Doped Optical Fiber (Matthijsse et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Patent Application Publication No. US2009/0041414 A1 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Patent Application Publication No. US2009/0003785 A1 for a Coupling Composition for Optical Fiber Cables (Parris et al.); U.S. Patent Application Publication No. US2009/0214167 A1 for a Buffer Tube with Hollow Channels, (Lookadoo et al.); U.S. patent application Ser. No. 12/466,965 for an Optical Fiber Telecommunication Cable, filed May 15, 2009, (Tatat); U.S. patent application Ser. No. 12/506,533 for a Buffer Tube with Adhesively Coupled Optical Fibers and/or Water-Swellable Element, filed Jul. 21, 2009, (Overton et al.); U.S. Patent Application Publication No. US2010/0092135 A1 for an Optical Fiber Cable Assembly, filed Sep. 10, 2009, (Barker et al.); U.S. patent application Ser. No. 12/557,086 for a High-Fiber-Density Optical Fiber Cable, filed Sep. 10, 2009, (Louie et al.); U.S. Patent Application Publication No. US2010/0067855 A1 for a Buffer Tubes for Mid-Span Storage, filed Sep. 11, 2009, (Barker); U.S. patent application Ser. No. 12/614,692 for Single-Fiber Drop Cables for MDU Deployments, filed Nov. 9, 2009, (Overton); U.S. Patent Application Publication No. US2010/0092140 A1 for an Optical-Fiber Loose Tube Cables, filed Nov. 9, 2009, (Overton); U.S. patent application Ser. No. 12/615,003 for a Reduced-Size Flat Drop Cable, filed Nov. 9, 2009, (Overton et al.); U.S. Patent Application Publication No. US2010/0092138 A1 for ADSS Cables with High-Performance Optical Fiber, filed Nov. 9, 2009, (Overton); U.S. patent application Ser. No. 12/615,698 for Reduced-Diameter Ribbon Cables with High-Performance Optical Fiber, filed Nov. 10, 2009, (Overton); U.S. Patent Application Publication No. US2010/0092139 A1 for a Reduced-Diameter, Easy-Access Loose Tube Cable, filed Nov. 10, 2009, (Overton); U.S. patent application Ser. No. 12/642,784 for a Method and Device for Manufacturing an Optical Preform, filed Dec. 19, 2009, (Milicevic et al.); U.S. patent application Ser. No. 12/648,794 for a Perforated Water-Blocking Element, filed Dec. 29, 2009, (Parris); U.S. patent application Ser. No. 12/649,758 for a UVLED Apparatus for Curing Glass-Fiber Coatings, filed Dec. 30, 2009, (Hartsuiker et al.); U.S. patent application Ser. No. 12/700,293 for a Central-Tube Cable with High-Conductivity Conductors Encapsulated with High-Dielectric-Strength Insulation, filed Feb. 4, 2010, (Ryan et al.); and U.S. patent application Ser. No. 12/710,584 for a Cable Having Lubricated, Extractable Elements, filed Feb. 23, 2010, (Tatat et al.).

In the specification and/or figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:

1. A multimode optical fiber, comprising:
a central core having an alpha-index profile with a radius ($r_1$); and
a depressed trench surrounding the central core, the depressed trench having a width ($w_t$) and a refractive index difference ($\Delta n_t$) with respect to an outer optical cladding;
wherein the depressed trench's width ($w_t$) is between about 0.5 micron and 2 microns;
wherein the depressed trench's refractive index difference ($\Delta n_t$) with respect to the outer optical cladding is substantially constant over the entire width ($w_t$) of the depressed trench and is between about $-4\times10^{-3}$ and $-1\times10^{-3}$;
wherein the central core's diameter ($2\cdot r_1$) is between about 47 and 53 microns;
wherein the central core has a maximum refractive index difference ($\Delta n_1$) with respect to the outer optical cladding of between about $11\times10^{-3}$ and $16\times10^{-3}$;
wherein the refractive index difference between the central core's alpha-index profile at the radius $r_1$ and the outer optical cladding is negative and greater than $\Delta n_t$.

2. A multimode optical fiber according to claim 1, wherein the optical fiber has a radial offset bandwidth at 25 microns (ROB25) of more than 4000 MHz·km.

3. A multimode optical fiber according to claim 1, wherein the central core's alpha-index profile has an alpha parameter (a) of between 1.9 and 2.1.

4. A multimode optical fiber according to claim 1, wherein the multimode optical fiber has an overfilled launch (OFL) bandwidth of more than 1500 MHz·km.

5. A multimode optical fiber according to claim 1, wherein the multimode optical fiber has an overfilled launch (OFL) bandwidth of more than 3500 MHz·km.

6. A multimode optical fiber according to claim 1, wherein the multimode optical fiber has an effective modal bandwidth (EMB) of more than 2000 MHz·km.

7. A multimode optical fiber according to claim 1, wherein the multimode optical fiber has an effective modal bandwidth (EMB) of more than 4000 MHz·km.

8. A multimode optical system comprising at least a portion of a multimode optical fiber according to claim 1.

9. A multimode optical system according to claim 8, wherein the system has a data rate of at least 10 GbE (Gb/s) over a distance of about 100 meters.

10. A multimode optical system according to claim 8, wherein the system has a data rate of at least 10 GbE (Gb/s) over a distance of about 300 meters.

11. A multimode optical fiber according to claim 1, wherein the depressed trench contiguously surrounds the central core.

12. A multimode optical fiber according to claim 1, wherein the optical fiber has (i) an effective modal bandwidth (EMB) greater than 2000 MHz·km and (ii) an overfilled launch (OFL) bandwidth greater than 1500 MHz·km.

13. A multimode optical fiber according to claim 1, wherein the optical fiber has (i) an effective modal bandwidth (EMB) greater than 4700 MHz·km and (ii) an overfilled launch (OFL) bandwidth greater than 3500 MHz·km.

14. A multimode optical system comprising at least a portion of a multimode optical fiber according to claim 1, wherein the system has a data rate of at least 10 GbE (Gb/s) over a distance of about 300 meters.

15. A multimode optical fiber according to claim 1, wherein the optical fiber has a numerical aperture (NA) that is 0.200±0.015.

16. A multimode optical fiber according to claim 1, wherein the optical fiber has a radial offset bandwidth at 23 microns (ROB23) of more than 2000 MHz·km.

17. A multimode optical fiber, comprising:
a central core having an alpha-index profile with a radius ($r_1$) and a diameter ($2\cdot r_1$) of between about 47 and 53 microns;
a depressed trench surrounding the central core, the depressed trench having a width ($w_t$) of between about 0.5 micron and 2 microns; and
an outer optical cladding;
wherein the maximum refractive index difference ($\Delta n_1$) between the central core's refractive index and the outer optical cladding's refractive index is between about $11\times10^{-3}$ and $16\times10^{-3}$;
wherein the depressed trench's refractive index difference ($\Delta n_t$) with respect to the outer optical cladding is substantially constant over the entire width ($w_t$) of the depressed trench and is between about $-4\times10^{-3}$ and $-1\times10^{-3}$;
wherein the refractive index difference between the central core's refractive index at the radius $r_1$ and the outer optical cladding's refractive index is negative and greater than $\Delta n_t$;
wherein the optical fiber has a numerical aperture (NA) that is 0.200±0.015;
wherein the optical fiber has a radial offset bandwidth at 25 microns (ROB25) of more than 2000 MHz·km;
wherein the multimode optical fiber has an overfilled launch (OFL) bandwidth of more than 1500 MHz·km; and
wherein the multimode optical fiber has an effective modal bandwidth (EMB) of more than 2000 MHz·km.

18. A multimode optical fiber according to claim 17, wherein the central core's alpha-index profile has an alpha parameter (a) of between about 1.9 and 2.1.

19. A multimode optical fiber according to claim 17, wherein the optical fiber has a radial offset bandwidth at 25 microns (ROB25) of more than 4000 MHz·km.

20. A multimode optical fiber according to claim 17, wherein the multimode optical fiber has an overfilled launch (OFL) bandwidth of more than 3500 MHz·km.

21. A multimode optical fiber according to claim 17, wherein the multimode optical fiber has an effective modal bandwidth (EMB) of more than 4000 MHz·km.

* * * * *